(12) United States Patent
Bonk et al.

(10) Patent No.: US 10,427,553 B2
(45) Date of Patent: Oct. 1, 2019

(54) ADJUSTABLE VEHICLE SEAT

(71) Applicant: FAURECIA AUTOMOTIVE SEATING, LLC, Auburn Hills, MI (US)

(72) Inventors: Jeffery T. Bonk, Chesterfield, MI (US); Dale J. Frye, West Olive, MI (US); Jared A. Judson, Medford, MA (US); Timothy J. Moulton, Newport, RI (US); Todd Zeilinger, Holland, MI (US); Matthew Shinew, Grand Rapids, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/761,141

(22) PCT Filed: Sep. 22, 2016

(86) PCT No.: PCT/US2016/052994
§ 371 (c)(1),
(2) Date: Mar. 19, 2018

(87) PCT Pub. No.: WO2017/053503
PCT Pub. Date: Mar. 30, 2017

(65) Prior Publication Data
US 2018/0264975 A1    Sep. 20, 2018

Related U.S. Application Data

(60) Provisional application No. 62/222,359, filed on Sep. 23, 2015.

(51) Int. Cl.
*B60N 2/02*   (2006.01)
*B60N 2/06*   (2006.01)
*B60N 2/20*   (2006.01)

(52) U.S. Cl.
CPC ........ *B60N 2/0248* (2013.01); *B60N 2/0228* (2013.01); *B60N 2/0252* (2013.01);
(Continued)

(58) Field of Classification Search
USPC ......................................................... 701/49
See application file for complete search history.

(56) References Cited

U.S. PATENT DOCUMENTS

| 7,667,345 B2 | 2/2010 | Budweg |
| 2004/0012236 A1 | 1/2004 | Mallard |

(Continued)

FOREIGN PATENT DOCUMENTS

| WO | 2012082052 | 6/2012 | |
| WO | WO-2012082052 A1 * | 6/2012 | ........... B60N 2/0228 |
| WO | 2015137939 | 9/2015 | |

OTHER PUBLICATIONS

International (PCT) Search Report and Written Opinion completed on Nov. 17, 2016 for International (PCT) App. No. PCT/US16/52994, 3823 1.WO II, 14 pages.

*Primary Examiner* — Lail A Kleinman
*Assistant Examiner* — Mahmoud M Kazimi
(74) *Attorney, Agent, or Firm* — Barnes & Thornburg LLP

(57) ABSTRACT

A vehicle seat includes a seat bottom and a seat back coupled to the seat bottom to extend away from the seat bottom. The seat back includes a backrest an a headrest coupled to the backrest to locate the backrest between the headrest and the seat bottom.

20 Claims, 12 Drawing Sheets

(52) U.S. Cl.
CPC ................. *B60N 2/06* (2013.01); *B60N 2/20* (2013.01); *B60N 2002/0256* (2013.01); *B60N 2002/0272* (2013.01)

(56) References Cited

U.S. PATENT DOCUMENTS

| | | | |
|---|---|---|---|
| 2007/0235297 A1* | 10/2007 | Stoschek | B60N 2/0228 |
| | | | 200/5 R |
| 2010/0026070 A1 | 2/2010 | Rohee | |
| 2012/0181833 A1* | 7/2012 | Nock | B60N 2/12 |
| | | | 297/341 |
| 2013/0200668 A1 | 8/2013 | Michalak | |
| 2013/0200670 A1* | 8/2013 | Oman | B60N 2/002 |
| | | | 297/217.3 |
| 2013/0234492 A1* | 9/2013 | Driessen | B60N 3/063 |
| | | | 297/423.25 |
| 2013/0320729 A1 | 12/2013 | Cooley | |
| 2016/0280096 A1 | 9/2016 | Bonk | |
| 2017/0015217 A1* | 1/2017 | Pike | B60N 2/0228 |

* cited by examiner

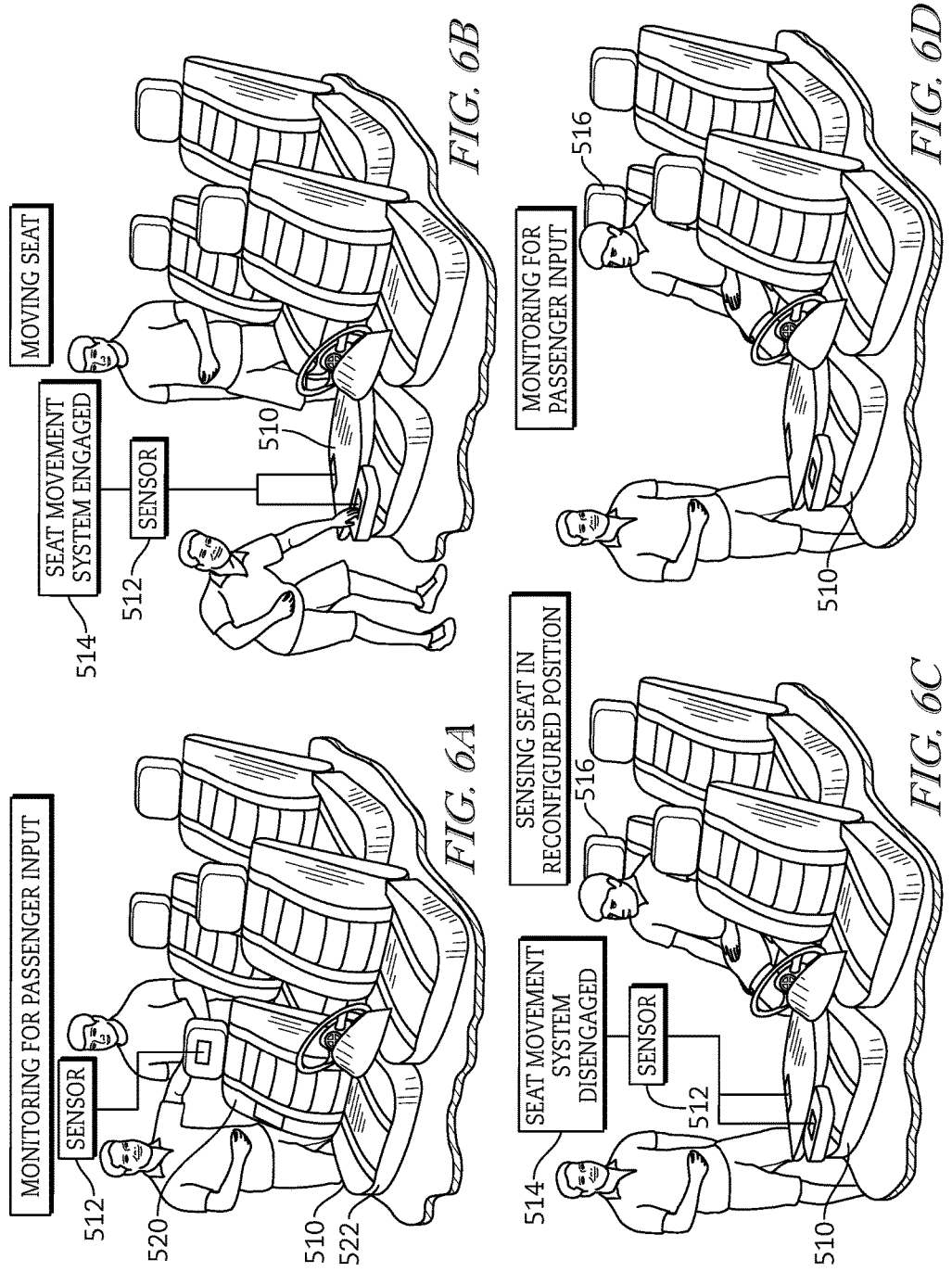

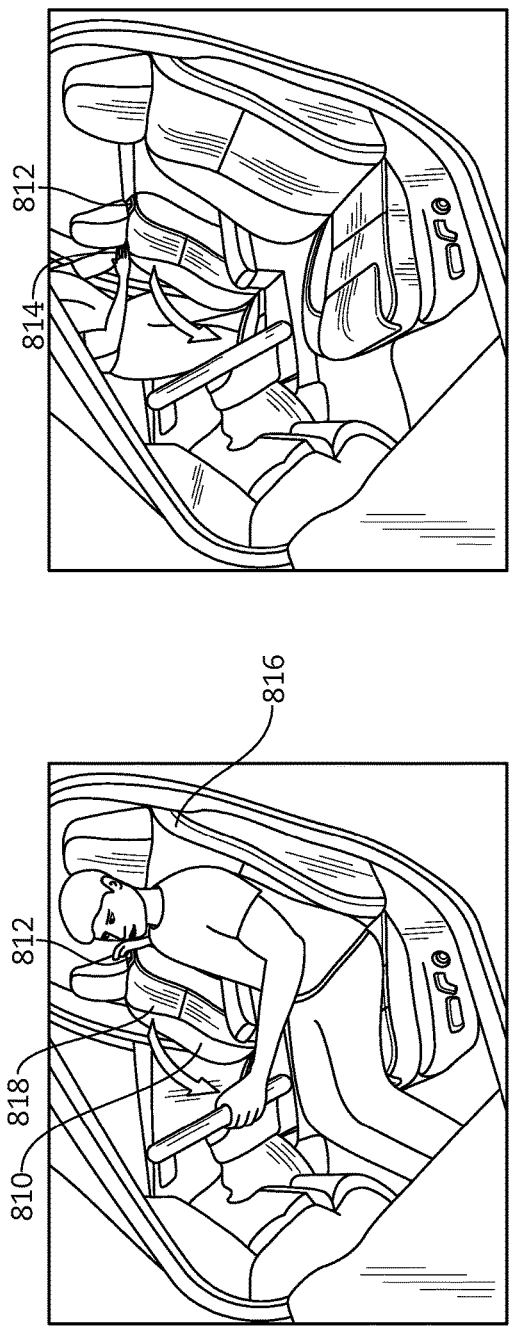

ADJUSTABLE VEHICLE SEAT

CROSS REFERENCE TO RELATED APPLICATIONS

This application is a U.S. national counterpart application of PCT International Application Serial No. PCT/US2016/052994, filed Sep. 22, 2016 and claims the benefit of and priority to U.S. Provisional Patent Application Ser. No. 62/222,359, filed Sep. 23, 2015, the entire contents of each of which are expressly incorporated by reference herein.

BACKGROUND

The present disclosure relates to vehicle seats, and particularly to vehicle seats movable within a passenger vehicle. More particularly, the present disclosure relates to vehicle seats that move to desired position and orientations in response to user inputs.

SUMMARY

According to the present disclosure, a vehicle seat includes a seat bottom and a seat back coupled to the seat bottom to extend away from the seat bottom. The seat back includes a backrest and a headrest coupled to the backrest to locate the backrest between the headrest and the seat bottom.

In illustrative embodiments, a vehicle-seat-movement system includes the vehicle seat, a motion unit, and a monitoring unit. The motion unit is coupled to the vehicle seat to cause the vehicle seat to move relative to a floor of a vehicle and the seat back to move relative to the seat bottom. The monitoring unit is configured to provide means for sensing intent of a driver adjacent to the vehicle seat to move the vehicle seat by contacting a predetermined portion of the seat with a predetermined force so that driver adjusts ergonomically the vehicle seat.

In illustrative embodiments, the monitoring unit includes a sensor and a controller coupled to the sensor and the motion unit. The controller is configured to activate the motion unit in response to detection of a predetermined force by the sensor. As a result, the position of the vehicle seat is adjusted.

In illustrative embodiments, the monitoring unit further includes an actuator. The actuator may include a pop-up bar located in the seat bottom having a release button. The release button may also raise the pop-up bar out of the seat bottom for gripping during seat rearrangement.

In illustrative embodiments, the seat-movement system includes a motion unit including a remote interface unit having a plurality of preset seat arrangement profiles, a monitoring unit integrated into the seat and adapted to receive ergonomically input from a driver seated adjacent to the seat, and a controller configured to receive inputs from the remote interface and the monitoring unit and control rearrangement the vehicle seat based on the inputs received.

In illustrative embodiments, the input from the remote interface unit may include selection of a preset seat arrangement profile. The input from the monitoring unit may include a force or force gesture on a predetermined portion of the seat. The controller may control motors coupled to the vehicle seat to move the seat back and/or the seat bottom to match the selected seat arrangement profile. The controller may release a lock to cause the seat bottom to slide along the floor and/or a lock in the seat back to cause the seat back to pivot about the seat bottom in response to remote interface and the sensor unit inputs.

In illustrative embodiments, a method of rearranging the vehicle seat begins with receiving an input at a monitoring unit located at a side bolster of the seat back, the seat bottom, or a headrest. The method then proceeds to controlling rearrangement of the seat based on the received input.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1A is a diagrammatic view showing a driver seated in a driver seat next to a passenger seat-movement system including a passenger vehicle seat and a motion system coupled to the passenger vehicle seat and configured to detect driver input via sensors coupled to the passenger vehicle seat;

FIG. 1B is a view similar to FIG. 1A showing the driver engaging a sensor coupled to a side bolster of a seat back nearest the driver and suggesting that the driver desires to rearrange the seat by engaging the sensor;

FIG. 1C is a view similar to FIGS. 1A and 1B showing movement of the passenger seat by a motion unit coupled to the passenger vehicle seat and suggesting that the motion unit is under command of the monitoring unit in response to the driver's continued engagement of the sensor of the monitoring unit;

FIG. 1D is a view similar to FIGS. 1A-1C showing that the motion unit has stopped moving the passenger vehicle seat in response to the driver stopping engagement of the sensor;

Figure 2:
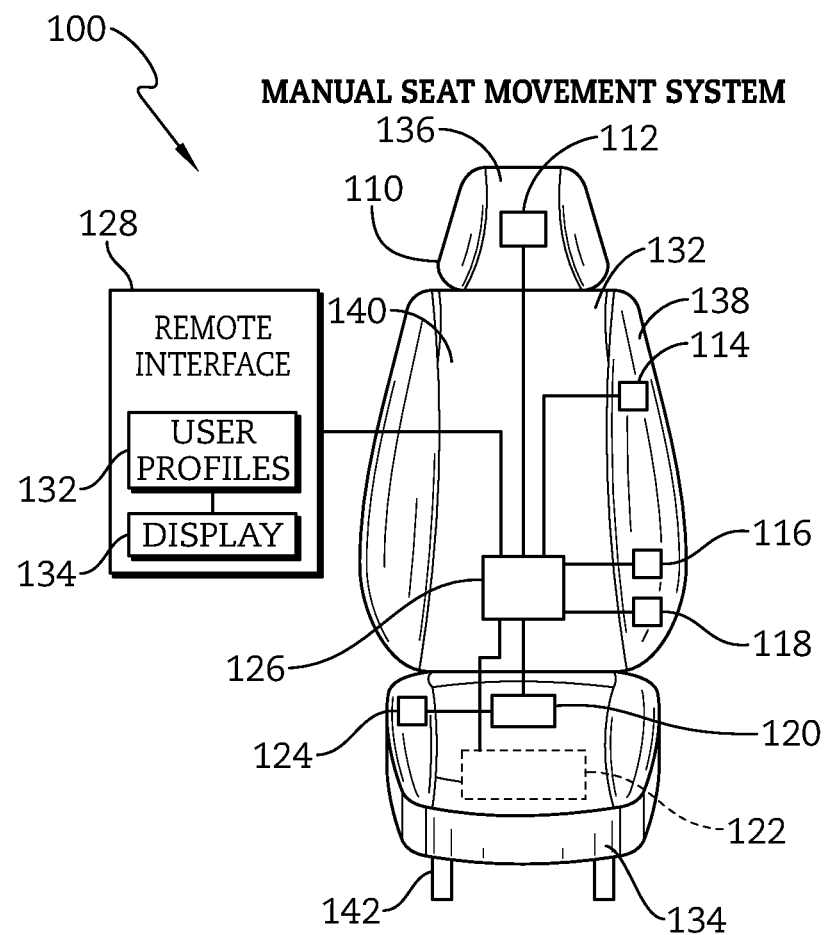
Figure 3:
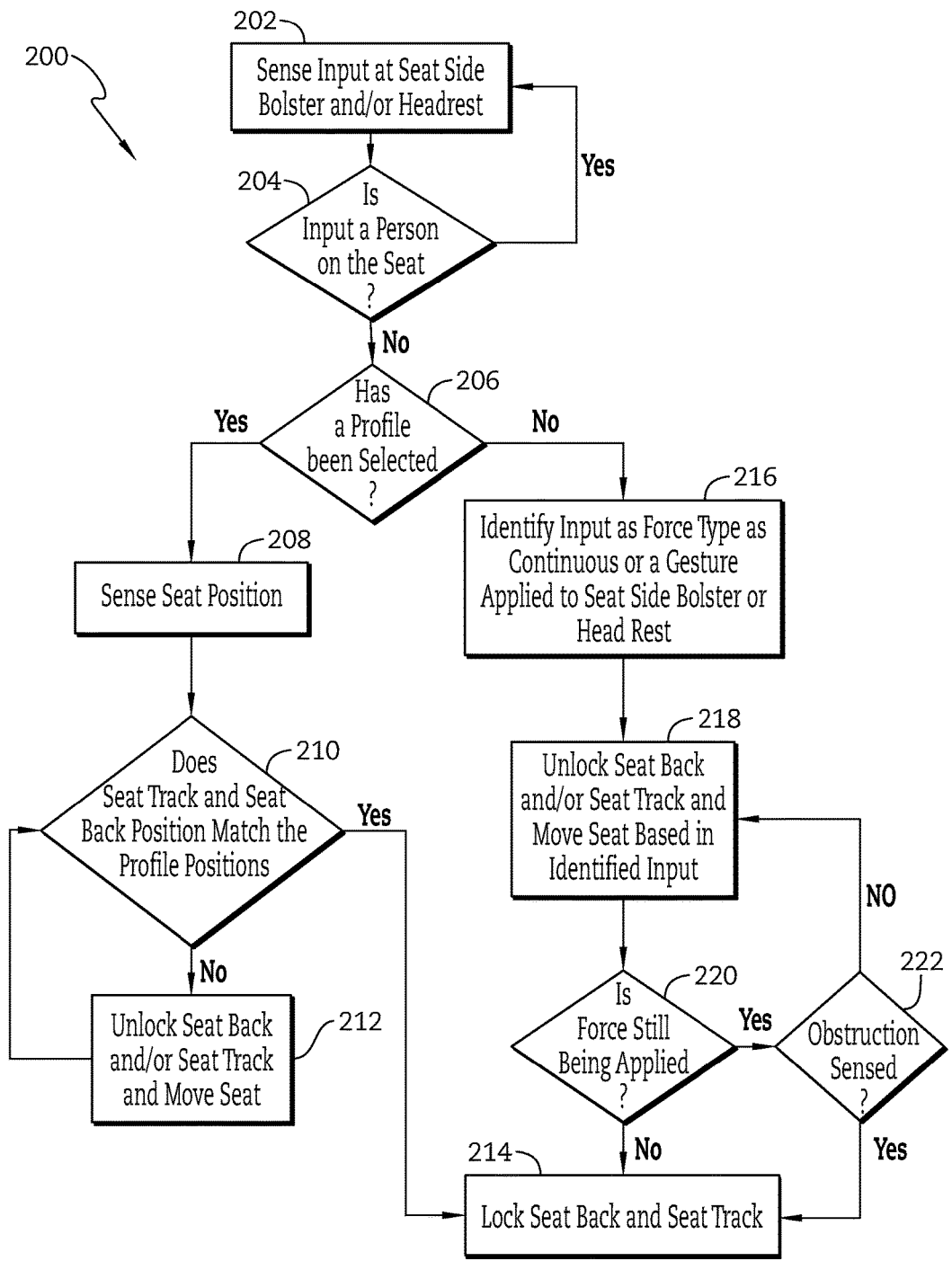
Figure 4:
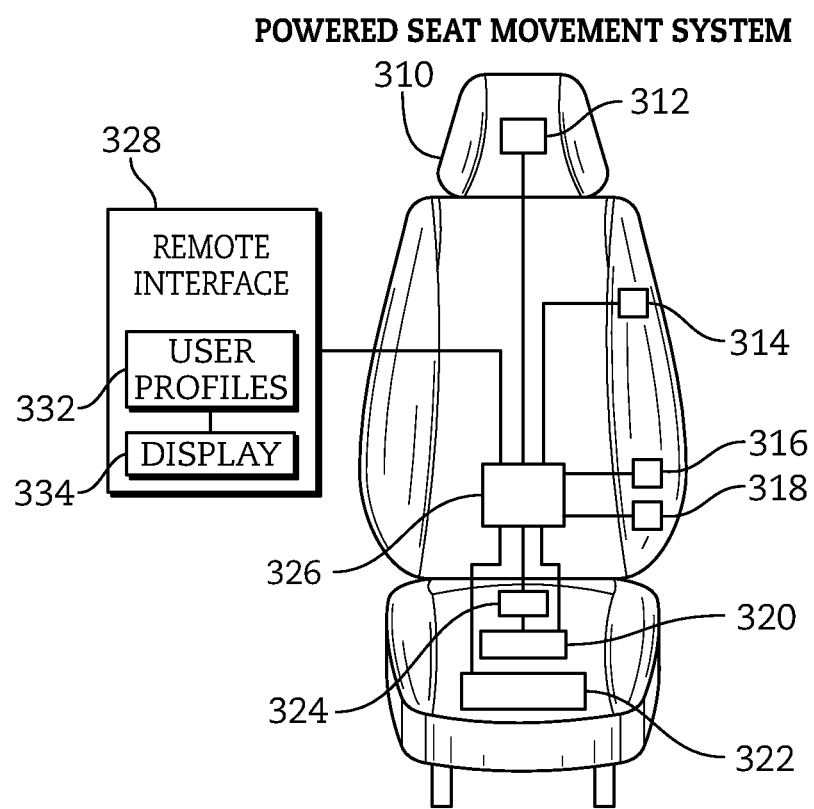
Figure 5:
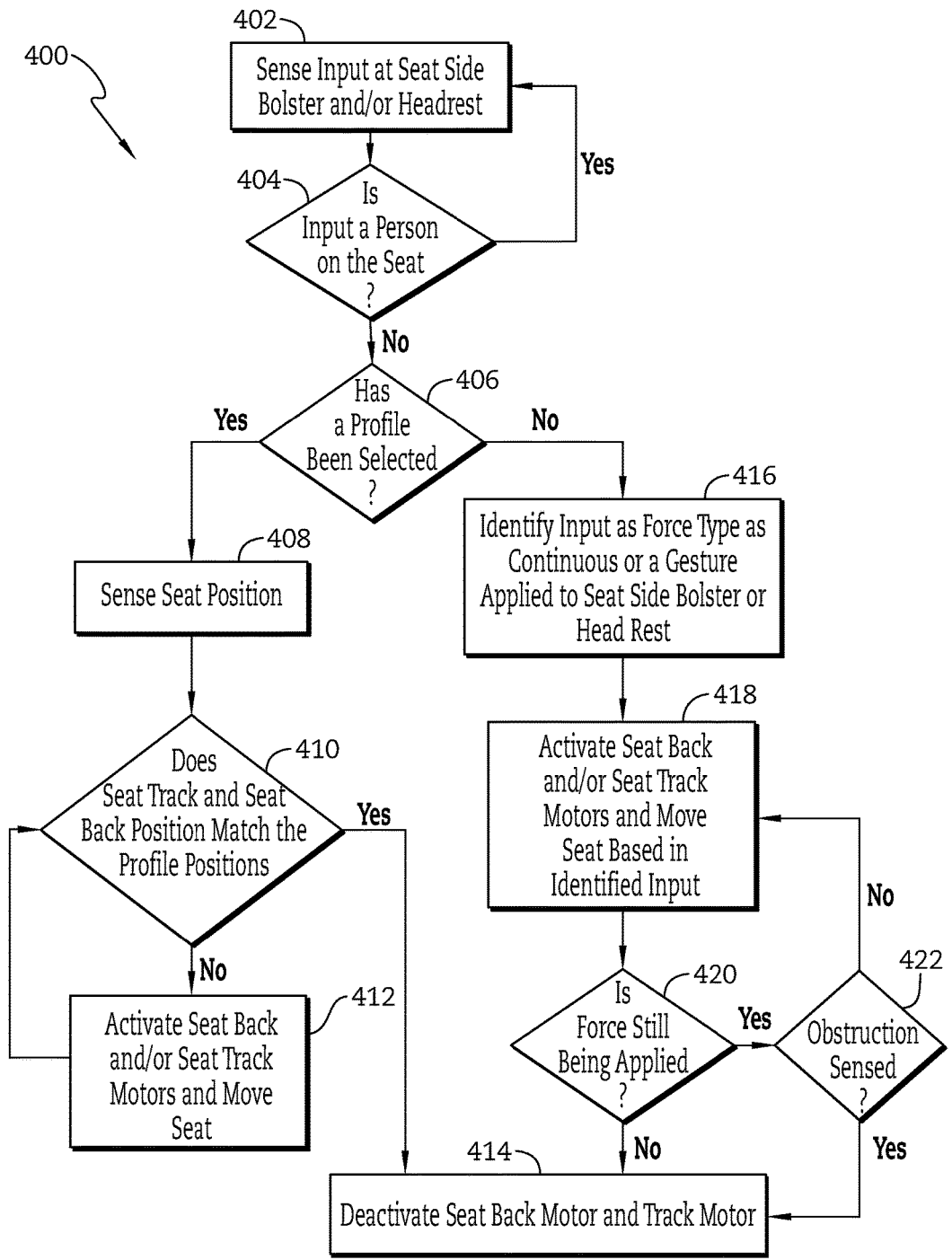
Figure 7B:
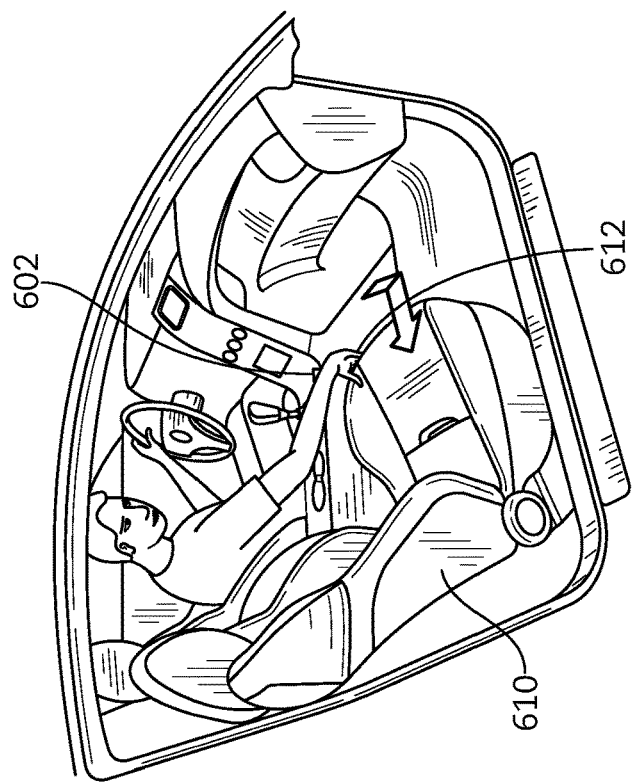
Figure 7A:
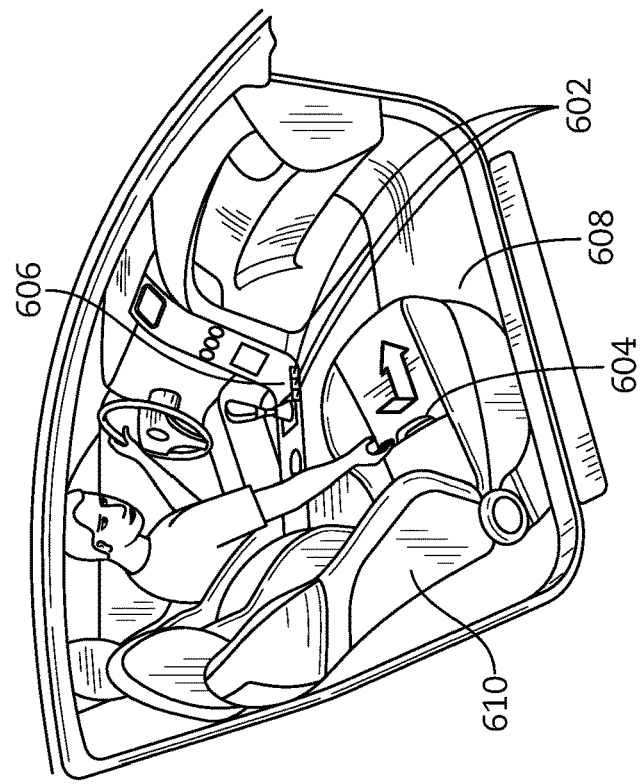
Figure 8:
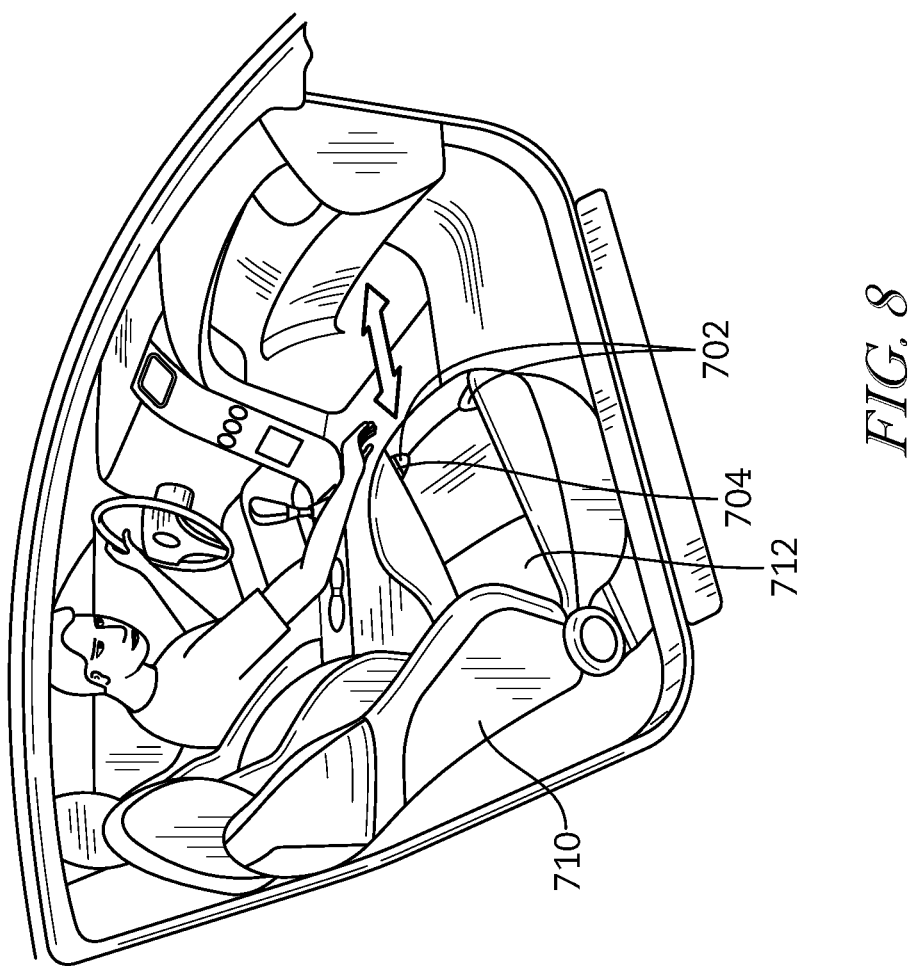
Figure 10B:
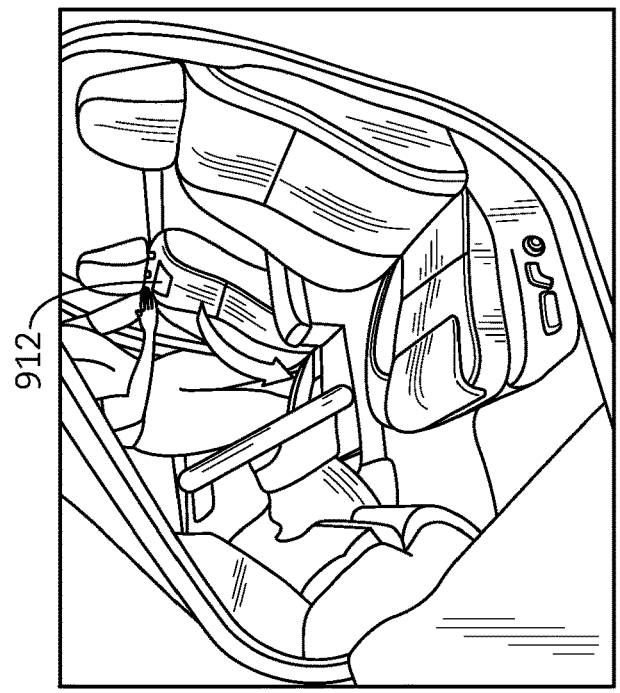
Figure 10A:
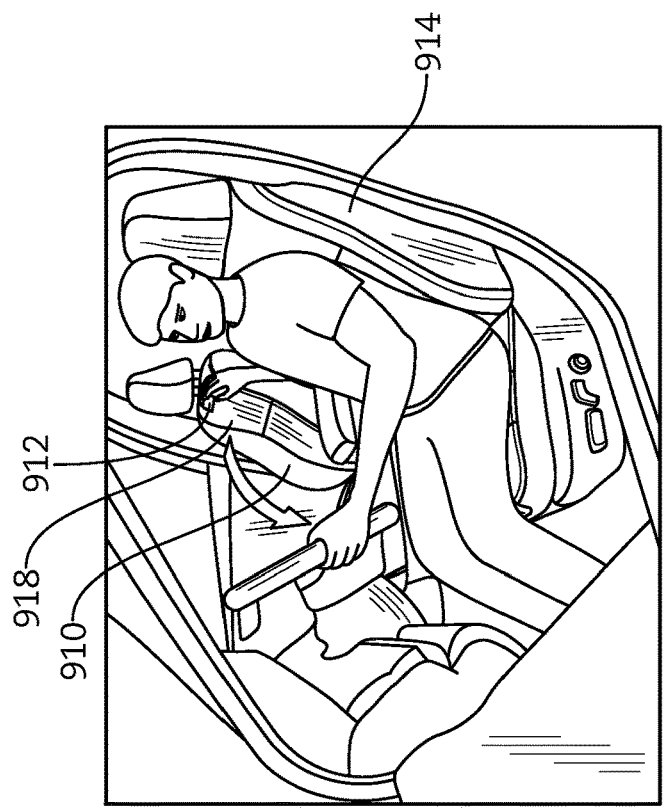
Figure 11B:
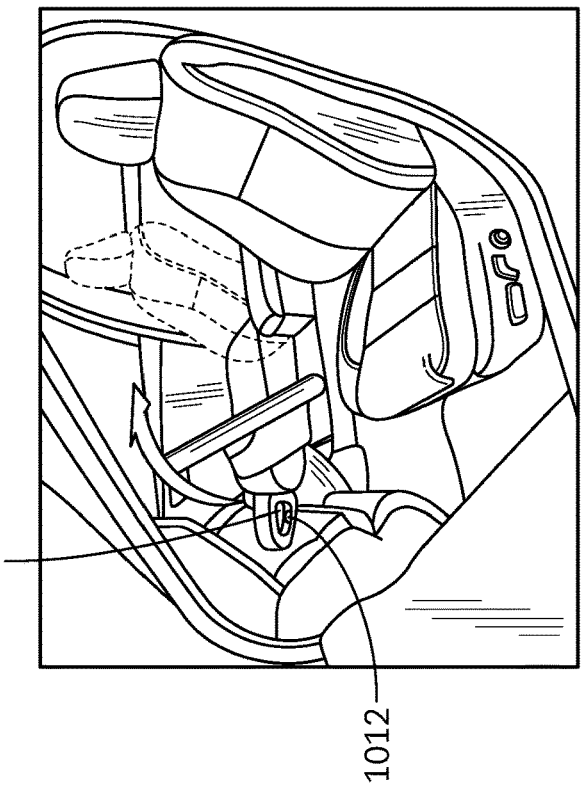
Figure 11A:
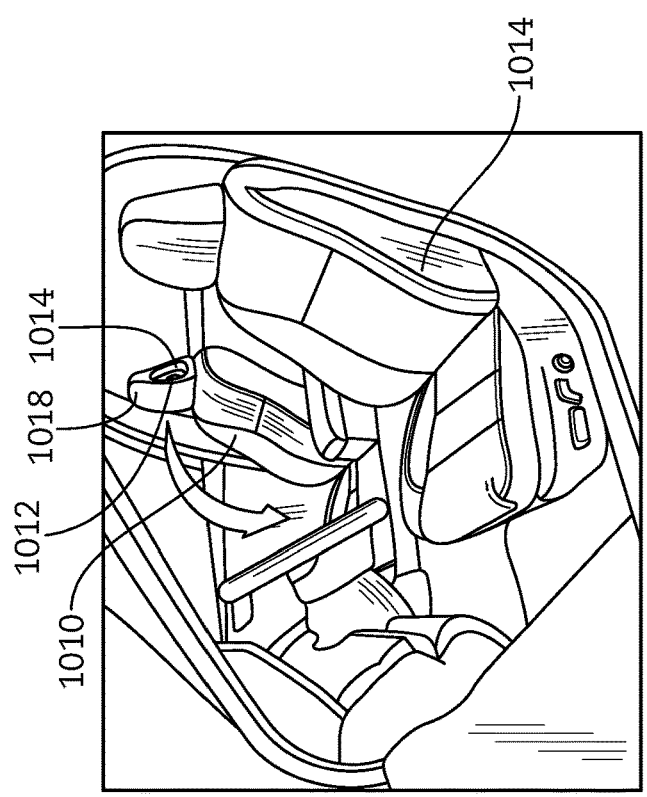
Figure 13:
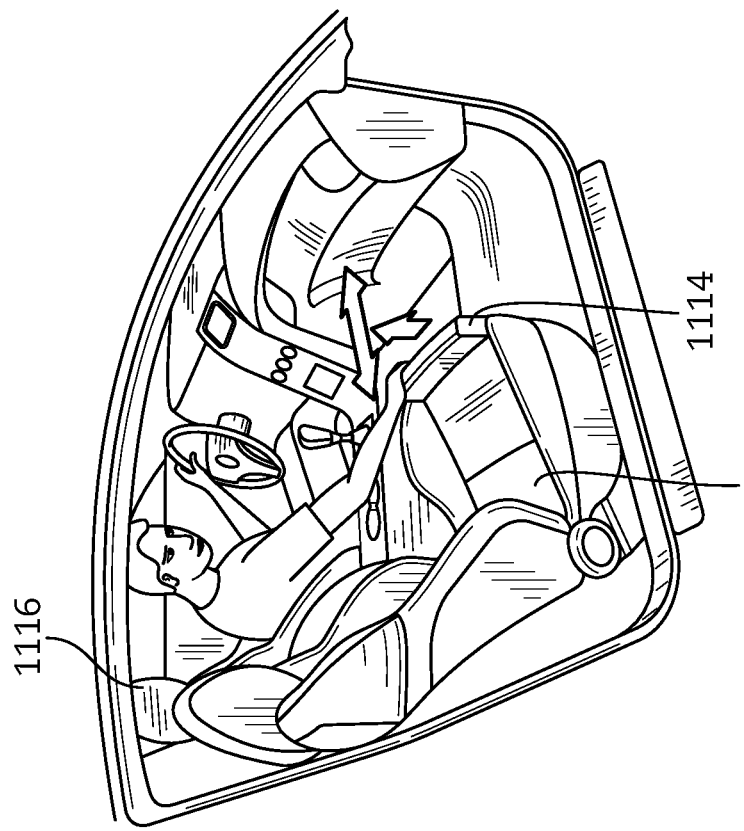
Figure 12:
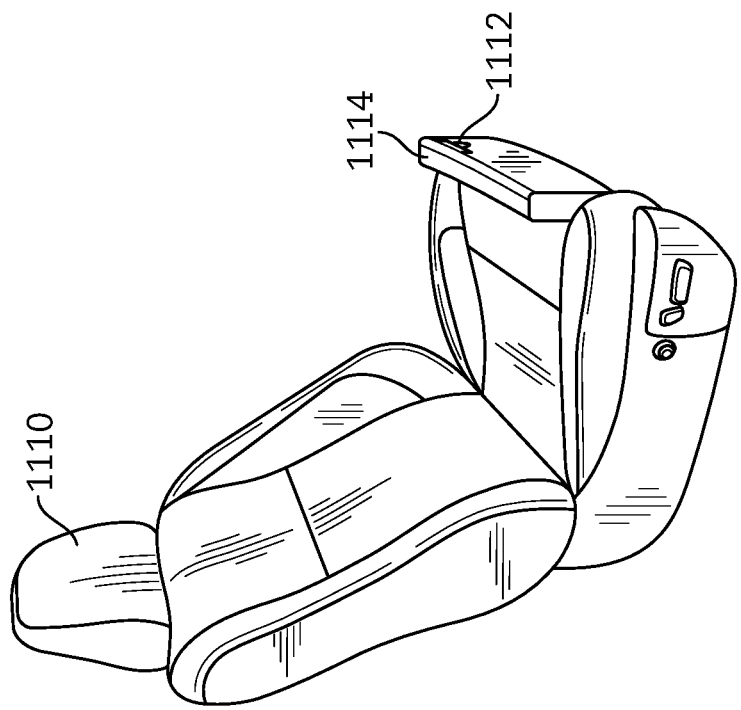

FIG. 2 is a diagrammatic view of a manual vehicle-seat movement system in accordance with the present disclosure showing that the manual seat-movement system include sensors for sensing input from a driver, position sensors for detecting a position of the vehicle seat, seat back and seat bottom actuators, a remote interface having a plurality of user profiles in communication with a controller allowing for movement of the passenger seat to predetermined positions, and an optional enablement unit to block selectively movement of the seat;

FIG. 3 is a diagrammatic view of a method for operating the manual seat-movement system of FIG. 2;

FIG. 4 is a diagrammatic view of a powered seat-movement system in accordance with the present disclosure showing that the seat-movement system includes sensors for sensing input from a driver, position sensors for detecting a position of the vehicle seat, seat back and seat bottom motors, a remote interface having a plurality of user profiles in communication with a controller allowing for movement of the vehicle seat to predetermined positions, and an optional enablement unit to block selectively movement of the vehicle seat;

FIG. 5 is a diagrammatic view of a method for operating the powered seat-movement system of FIG. 3;

FIGS. 6A-6D are a series of diagrammatic views showing how a passenger rearranges ergonomically a passenger vehicle seat from the passenger side of the vehicle using the seat-movement system;

FIG. 6A is a diagrammatic view showing a passenger standing beside a seat-movement system including a passenger vehicle seat and suggesting that a monitoring unit included in the seat-movement system is monitoring for user input via sensors coupled to a backrest and headrest included in the passenger vehicle seat;

FIG. 6B is a view similar to FIG. 6A showing a passenger engaging a sensor coupled to the headrest to cause a motion unit included in the seat-movement system to facilitate rotation of the seat back forward to make room for entry of a back-seat passenger;

FIG. 6C is a view similar to FIGS. 6A and 6B showing that the passenger has ceased engagement of the sensor and that the seat-movement system has been disengaged as a result of the seat back arriving in the reconfigured position;

FIG. 6D is a view similar to FIGS. 6A-6C showing the monitoring unit monitoring for user input to re-arrange the passenger vehicle seat;

FIG. 7A is a perspective view of another embodiment of a monitoring unit in accordance with the present disclosure showing that the monitoring unit includes sensors coupled on a central console of the vehicle and an ergonomic grip formed in a seat bottom that is configured to allow the driver to engage the seat bottom and move the vehicle seat forward;

FIG. 7B is a view similar to FIG. 7A showing that driver is able to engage a front edge of the seat bottom to move the vehicle seat rearward;

FIG. 8 is a perspective view of another embodiment of a monitoring unit in accordance with the present disclosure showing that the monitoring unit includes sensors located in a periphery of the seat bottom and suggesting that each sensor is configured to provide a grip point for movement of the seat bottom by the driver or a passenger;

FIGS. 9A-C are a series of perspective views showing use of another embodiment of a monitoring unit in accordance with the present disclosure;

FIG. 9A is a perspective view of a driver engaging a first backrest sensor coupled to a backrest of a seat back included in a passenger vehicle seat;

FIG. 9B is a view similar to FIG. 9A showing a passenger outside the vehicle engaging a second backrest sensor coupled opposite the first backrest sensor;

FIG. 9C is a view similar to FIGS. 9A and 9B showing a rear passenger inside the vehicle behind the passenger vehicle seat engaging both backrest sensors;

FIG. 10A is a perspective view of another embodiment of a monitoring unit in accordance with the present disclosure showing that the monitoring unit includes a sensor coupled to the seat back in a top-center portion of the seat back;

FIG. 10B is a view similar to FIG. 10A showing the sensor engaged by a passenger outside the vehicle to move the seat back;

FIG. 11A is a perspective view of another embodiment of a monitoring unit in accordance with the present disclosure showing that the monitoring system includes a sensor coupled to a driver-side of a headrest included in a passenger vehicle seat;

FIG. 11B is a view similar to FIG. 11A suggesting that use of the sensor allows rotation of seat back upward away from the seat bottom;

FIG. 12 is a perspective view of another embodiment of a monitoring unit in accordance with the present disclosure showing that monitoring unit includes a push bar coupled to a front edge of a seat bottom included in a passenger vehicle seat and a sensor coupled to a front side of the push bar and suggesting that the push bar is movable up and down relative to the seat bottom; and FIG. 13 is a view similar to FIG. 12 showing a driver engaging the sensor, resulting in rising of the push bar from the seat bottom for the driver to grip and move the passenger vehicle seat forward and backward.

DETAILED DESCRIPTION

A seat-movement system in accordance with the present disclosure includes a vehicle seat, a motion unit, and a monitoring unit as shown in FIGS. 1A-2, 4, and 6A-13. A vehicle seat 10 includes, for example, a seat bottom 22, a seat back 20, and a headrest 36. Seat back 20 is coupled to seat bottom 22 to rotate relative seat bottom 22. Vehicle seat 10 is coupled to a floor of a vehicle to slide longitudinally forward and backward along a track 16. Monitoring unit 12 is configured to receive an input from a user desiring to rearrange vehicle seat 10 and communicate via a controller 126 with a motion unit to cause vehicle seat 10 to move. Monitoring unit 12 may be provided in one or more places with respect to vehicle seat 10 to permit users to ergonomically signal for rearrangement of vehicle seat 10. Motion unit may be motorized, manual, or a combination of the two.

One process for reconfiguring a vehicle seat 10 (also called passenger seat 10) by a driver from a driver seat 18 is shown, for example, in FIGS. 1A-1D. However, the process may be performed by a passenger, in a passenger seat, to a driver seat adjacent the passenger seat. A seat-movement system 14 includes passenger seat 10, a monitoring unit 12, a motion unit as suggested in FIGS. 1A-1D. Monitoring unit 12 includes one or more sensors located within reach of the driver allowing the driver to rearrange passenger seat 10 from the driver's seat location. Monitoring unit 12 is configured to sense the driver's intent to adjust a configuration of passenger seat 10 by contacting a sensor within reach of the driver and re-adjust passenger seat 10 accordingly without the driver leaving driver seat 18.

Figure 1A:
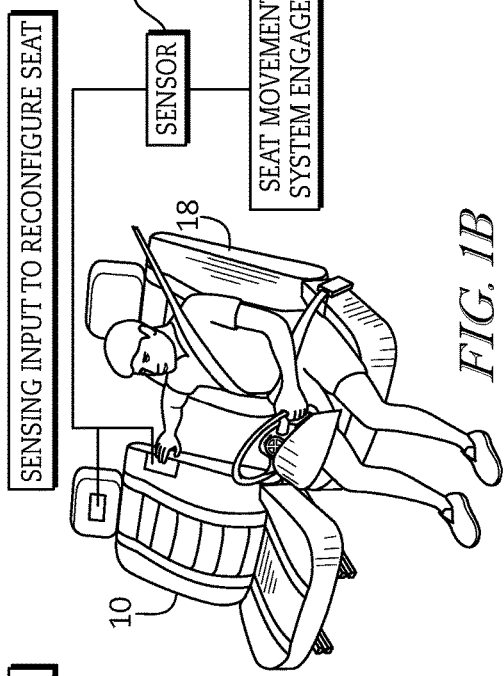
FIGS. 1A-1D are a series of diagrammatic views of one embodiment of a seat-movement system configured to allow a driver to rearrange ergonomically a passenger seat while the driver remains in a seated position in a driver's seat.

Passenger seat 10 is located adjacent driver seat 18 as shown in FIG. 1A. A plurality of sensors 12 are coupled to passenger seat 10 and are located in a seat side bolster nearest to the driver or a headrest so that the driver can reach sensors 12 from driver seat 18 as suggested in FIGS. 1B and 1C. One or more sensors 12 cooperating to establish monitoring unit 12 may be located in any number of locations. Some sensors are located within reach of the driver while other sensors may be located out of reach for a driver.

Figure 1B:
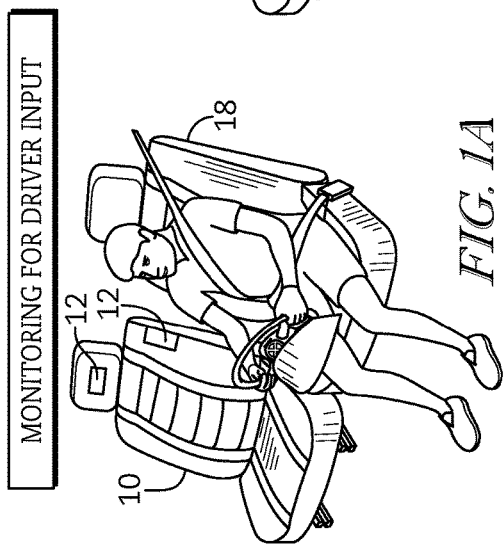
Figure 1C:
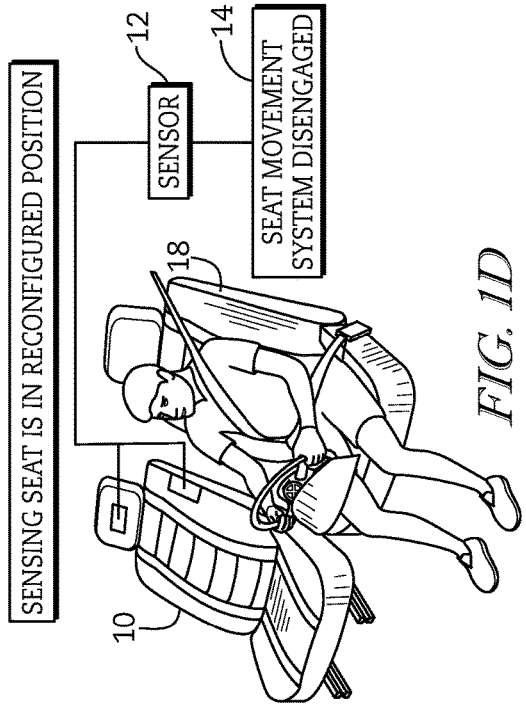
Figure 1D:
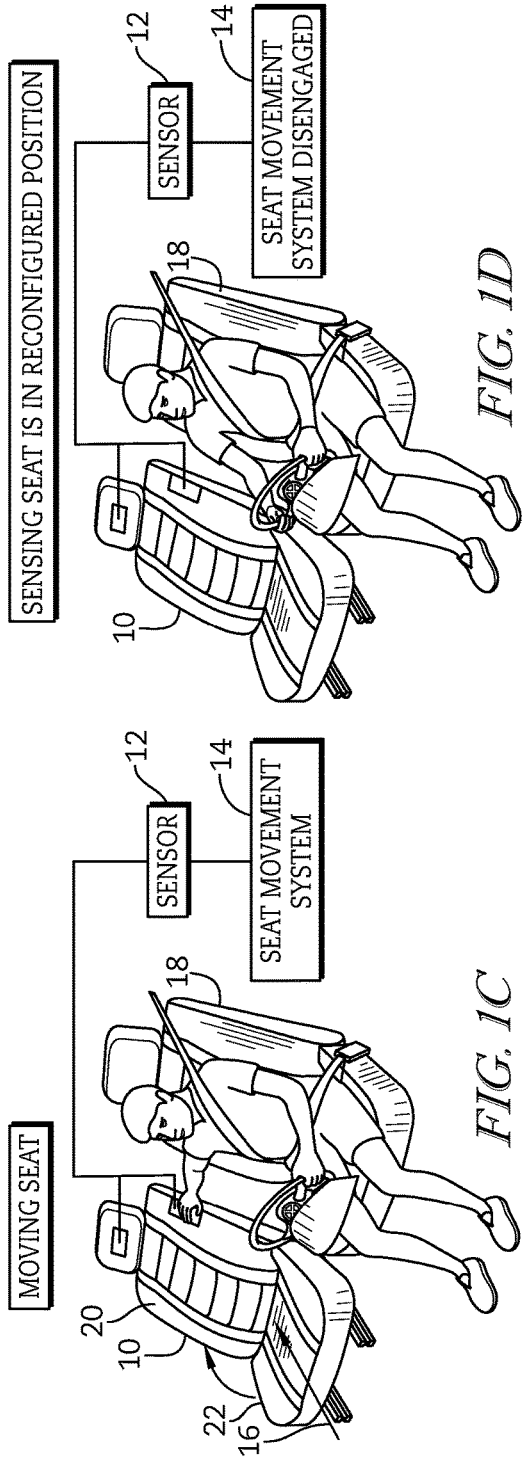

In use, the driver engages a sensor 12 coupled to passenger seat 10 indicating the driver intends to move passenger seat 10 as shown in FIG. 1B. Seat-movement system 14 engages based on the sensor input and the motion unit permits movement of passenger seat 10. The sensed input results in corresponding movement of seat back 20 relative to seat bottom 22 as shown in FIG. 1C. In some example, the sensed input also results in movement of passenger seat 10 back and forth along track 16. Seat-movement system 14 may disengage upon sensing passenger seat 10 in a desired reconfigured position. As a result of disengaging, passenger seat 10 remains in the reconfigured position. In this example, sensing of passenger seat 10 in the reconfigured position is determined when the driver stops engaging sensor 12.

Another embodiment of a seat-movement system 100 in accordance with the present disclosure is shown in FIG. 2. Seat-movement system 100 is a manual seat-movement system 100. Manual seat-movement system 100 includes a vehicle seat, a monitoring unit including one or more sensors 112, 114, and a motion unit including actuators 118, 120.

One or more sensors 112, 114 are located on the vehicle seat within reach of a driver of the vehicle as shown in FIG.

2. A first sensor 112 is coupled to a headrest 136 included in the vehicle seat. A second sensor 114 is coupled to a side bolster 138 included in a backrest of the vehicle seat. However, sensors may be coupled in any suitable location using any number of suitable sensors.

The seat motion unit includes a plurality of position sensors 116, 124, seat actuators 118, 120, and a remote interface 128 as shown in FIG. 2. A seat-back position sensor 116 monitors a position of a seat back 140 relative to a seat bottom 134. A seat-track position sensor 124 monitors position of the vehicle seat relative to a floor. A seat-back actuator 118 and a seat-track actuator 120 are provided to release seat back 140 and seat bottom 134 from track 142 allowing movement. A remote interface 128 may be used to store a plurality of user profiles 132 and to provide a display 134 to a user. An enablement unit 122 blocks selectively movement of the vehicle seat.

The components of the manual seat-movement system 100 are in communication with a controller 126. Controller 126 includes, for example, a processor and a memory with instructions stored therein which are executed by the processor.

In one example, sensors 112, 114 are force sensors. In another example, sensors 112, 114 are accelerometers. In another example, sensors 112, 114 are push buttons. Controller 126 may be configured to also detect predetermined gesture inputs at sensors indicating one or both of the seat back and seat track actuators should be released 118, 120. For example, particular tap patterns of 1, 2, and 3, taps may be recognized by the controller to indicate the release of the back and/or seat track actuators. Reference is hereby made to U.S. Patent Application Publication No. 2016/0101710 filed Oct. 8, 2016 and entitled SEAT POSITION SENSING AND ADJUSTMENT for disclosure relating to use of accelerometers as sensors in vehicle seat, which application is hereby incorporated in its entirety herein Remote interface 128 may be located, for example, in a central console of a vehicle. Remote interface 128 may store and be user programmable to store a plurality of user profiles 132. In one example, user profiles 132 may be particular seat configurations for the position of seat back 140 and seat bottom 134. In another example, user profiles 132 may be user-specific gesture patterns which are configured for specific users and associated with specific user preferences. A user may select a profile 132 on a display 134. Display 134 may be configured to display user profile 132 as well as the relative position of the seat before, during, and after rearranging the seat.

In operation, sensors may sense input at one or more sensors located in a seat side bolster and/or headrest 202. Input may be sensed at other locations within reach of a driver. The system may determine if a person is in the seat 204 and if so return to sensing for sensor input. For example, enablement unit 122 may include one or more sensors such as weight sensors, or be programmed with a threshold force applied to the sensors 112, 114, to determine if a person is in the seat and thus the input is not an input to reconfigure the seat.

Upon determination that the input is not a person on the seat, the system determines if a profile has been selected 206. For example, a user may select a user profile 132 at the remote interface 128 to relay the desired seat reconfiguration to the system. If a profile has been selected, the system senses the current seat position 208 and determines if one or both of the seat back and seat track positions match the profile positions 210. If they do, the seat remains in the locked position 214. If one or both of the seat back or seat track do not match the profile positions, the respective seat back and or seat back actuators are released, unlocking the seat back/and or seat bottom so that the user may move seat 212.

The system will continue to monitor seat back and seat track positions 210 until they match the profile positions and then the seat back and seat track are locked 214. If no profile has been selected 206, then the input is identified as a continuous force or gesture applied 216 and a seat back and/or seat track is unlocked based on the identified input 218 allowing the user to move the seat. If no force is continued to be applied, the seat back and/or seat track are locked 214. If force is being applied and an obstruction is sensed 222, the seat back and/or seat track are locked 214. If no obstruction is sensed 222, the seat back and/or seat track remain unlocked until no force is still being applied and then they are locked 214.

In another embodiment, a seat-movement system is provided that is a powered seat-movement system 300 as show in FIG. 4. Powered seat-movement system 300 also includes one or more sensors 312, 314 which cooperate to establish a monitoring unit. Sensors 312, 314 are integrated into the seat and arranged to be within reach of a driver of the vehicle. In this embodiment, the sensors are shown to be in a headrest 336 and a side bolster 338. A sensor could be located in a seat bottom 334 within reach of the driver as well. Reference is hereby made to U.S. application Ser. No. 15/079,581 filed Mar. 24, 2016 and entitled VEHICLE SEAT for disclosure relating to seat-movement systems, which application is hereby incorporated in its entirety herein A motion unit included in powered seat-movement system 300 includes a plurality of position sensors, motors, and a remote interface. A seat-back position sensor 316 and a seat-track position sensor 320 monitor position of seat back 340 relative to seat bottom 334 and seat bottom 334 along track 142 respectively. Remote interface 328 may be provided for storing a plurality of user profiles 332 and providing a display 334 to a user. Powered seat-movement system 300 employs seat back motor 318 and seat track motor 324 to move automatically the seat back and seat bottom to desired configurations. The components of powered seat-movement system 300 are in communication with a controller 326.

Components of powered seat-movement system 300 correspond to the components of the manual seat-movement system 100 with the exception of the seat back motor 318 and seat track motor 324. Controller 326 may be configured to also detect predetermined gesture inputs at sensors indicating one or both of the seat back and seat track motors should be activated 318, 320 to move seat 310. The amount of force applied to sensors 314, 316 may be directly related to the speed of motors 318, 324 in rearranging the seat 310. Reference is hereby made to U.S. patent application Ser. No. 15/079,730 filed Mar. 24, 2016 and entitled SEAT ADJUSTER for disclosure relating to use of gestures for inputs, which application is hereby incorporated in its entirety herein In a method of powered operation 400, sensors may sense input at the seat side bolster and/or headrest 402. Input may be sensed at other sensor locations within reach of a driver. The system may determine if a person is in the seat 404 and if so return to sensing for sensor input. For example, enablement unit 322 may include one or more sensors such as weight sensors, or be programmed with a threshold force applied to the sensors 312, 314, to determine if a person is in the seat and thus the input is not an input to reconfigure the seat.

Upon determination that the input is not a person on the seat, the system determines if a profile has been selected 406. For example, a user may select a user profile 332 at remote interface 328 to relay the desired seat reconfiguration to the system. If a profile has been selected, the system senses the current seat position 308 and determines if one or both of the seat back and seat track positions match the profile positions 410. If they both do, the seat remains in the locked position 414. If one or both of the seat back or seat track do not match the profile positions, the respective seat back and or seat back motors are powered, moving the seat back/and or seat bottom. The system will continue to monitor seat back and seat track positions until they match the profile positions 410 and then the seat back and seat track are locked 414.

If no profile has been selected 406, then the input is identified as a continuous force or gesture applied 416 and a seat back and/or seat track is unlocked based on the identified input 418 allowing the user to move the seat. If no force is continued to be applied, the seat back and/or seat track are locked 414. If force is being applied and an obstruction is sensed 422, the seat back and/or seat track are locked 414. If no obstruction is sensed 422, the seat back and/or seat track remain unlocked until no force is still being applied and then they are locked 414.

A process for reconfiguring a passenger seat 510 by a passenger outside a vehicle beside passenger seat 510 is shown, for example, in FIGS. 6A-6D. A seat-movement system 514 includes passenger seat 510 as described in detail above. Seat-movement system 514 may sense the passenger's intent to adjust the seat configuration as a result of the passenger contacting a sensor within ergonomic reach of the passenger. As a result of receiving the sensor input, passenger seat 510 is readjusted accordingly without requiring bending or straining on the part of the passenger.

A monitoring unit included in seat-movement system 514 includes one or more sensors 512 accessible by a user located outside the vehicle on a passenger side of the vehicle as shown in FIG. 6A. In this embodiment, the passenger engages a sensor 512 located in a headrest as seen in FIG. 6B. Seat-movement system is engaged 514 and, in this embodiment, seat back 520 folds forward towards seat bottom 522 to make space for a rear seat 516 passenger to enter or exit the vehicle. As shown in FIG. 6C, seat-movement system 514 is disengaged when the passenger is no longer contacting the sensor 512 and the seat is locked in position. This configuration provides space for rear passenger to enter or exit a rear seat 516 of the vehicle.

The system then continues to monitor for passenger input. For example, the seat 510 may remain in this folded configuration, or the sensor 512 may be engaged again by the passenger so that the passenger seat back 520 is rotated back away from the seat bottom 522 to allow the passenger to sit in the passenger seat 510.

Several different embodiments of monitoring units including buttons, sensors, and/or actuators which may be implemented in a vehicle seat with manual and powered seat-movement systems 100, 300 as suggested in FIGS. 7-13. Although specific powered and manual seat-movement systems have been disclosed by way of example, the monitoring units may be incorporated into seat-movement systems having any combination or type of motion units allowing movement of the seat. As seen in these embodiments, one or more sensors included in the monitoring units are within the natural reach of a driver and are ergonomically located to minimize undue strain on the driver attempting to rearrange the passenger seat. In some of the embodiments, one or more sensors are also ergonomically positioned for a passenger outside the vehicle or passenger inside the vehicle (sitting on a rear vehicle seat) to be able to rearrange the seat while minimizing undue strain.

One sensor implementation is a sensor 602 located on a central console 606 as shown in FIGS. 7A and 7B. Passenger seat 610 is equipped with a soft grip cup 604 to assist a driver in translating seat 610 along a track on the floor 608. In operation, the seat bottom or back may be released from a locked position via sensors in the form of activation buttons 602 as shown in FIG. 7A. Activation buttons 602 may be programmed to have a particular time window, for example 5 seconds, in which the seat 610 remains unlocked. The driver may then use the soft grip cup 604 to move the seat forward along the floor 608. Soft grip cup 604 may be a pocket like structure formed in a bottom of seat 610 that allows a user to insert a portion of his hand to get a grip on the seat. In another example, the driver may cup the front of the seat bottom 612 to move the seat 610 in a rearward direction along the floor 608 toward the back of the vehicle as shown in FIG. 7B.

A pair of sensors 702 may be coupled to seat bottom 712 as shown in FIG. 8. Sensors 702 are placed so that one is reached easily by the driver while another is reached easily by a passenger outside the vehicle. The sensor here is shown as a button that when depressed creates a depression space 704 that provides a grip point to insert the user's thumb into to push the seat 710 forward or pull the seat 710 back.

A pair of sensors 812, 814 are mounted in a shoulder of a seat back 818 as shown in FIGS. 9A-9C. One sensor 812 is accessible by the driver as shown in FIG. 9A. The other sensor 814 is accessible by an outside passenger as shown in FIG. 9B. Both sensors 812, 814 are accessible by a rear vehicle passenger as show in FIG. 9C. As seen in FIG. 9A, driver may engage sensor 812 within reach of the driver in order to rotate the seat back about the seat bottom. Similarly, outside passenger may engage the other shoulder mounted sensor 814 to rotate the seat back 818 about the seat bottom. Further, a passenger in the second row of the vehicle behind the passenger seat 810 may engage one or, easily both sensors 812, 814 to rotate the seat back 810 about the seat bottom.

A single sensor 912, centered in the upper portion of passenger seat back 918, is within reach of and can be used by both the driver and an outside passenger to move the seat as shown in FIGS. 10A and 10B. The sensor is a release handle 912 that can be pulled by the driver from the driver's seat 914 to permit rotation of seat back 918 about the seat bottom. Release handle 912 can also be pulled by outside passenger to permit rotation of seat back 918 about the seat bottom.

An implementation of a sensor 1012 in a headrest 1018 of a passenger seat 1010 is shown, for example, in FIGS. 11A and 11B. Sensor 1012 is located in a depression 1014 formed in headrest 1018 facing a driver's seat 1016. It is contemplated that a similar arrangement may be on the opposite side of the headrest 1018 (not shown) for passenger access. Depression 1014 may provide a gripping area for the driver to use when rotating the seat back of seat 1010 forward or backward. Depression 1014 and sensor 1012 are located in a side of the headrest 1018 so that they are easily accessible when seat is in an upright position in FIG. 11A as well as when it is in a forward folded position as shown in FIG. 11B.

In some embodiments, the sensor may be integrated into a pop-up push bar 1114 as shown in FIG. 12. Engagement with sensor 1112 may cause pop-up push bar 1114 to rise up vertically from a seat 1110. Sensor 1112 may further allow the seat 1110 to be translated forward and rearward as shown in FIG. 13. Pop-up push bar 1114 provides a larger grip point to move seat 1110 forward and rearward. Pop-up push bar 1114 also helps to hold items such as bags and boxes placed in the passenger seat from sliding forward. When not in use, vertical force placed on a top center portion of pop-up push bar 1114 will push the bar in a direction downward toward the floor so that pop-up push bar 1114 is flush with a top surface of a bottom of seat 1110.

The following numbered clauses include embodiments that are contemplated and non-limiting:

Clause 1. A seat-movement system comprising
a seat including a seat bottom adapted to move along a floor of a vehicle and a seat back coupled to the seat bottom to move relative to the seat bottom,
a motion unit coupled to the seat and configured to permit a user to move the seat, and
a monitoring unit coupled the seat and the motion unit and configured to provide means for sensing intent of the user located in spaced-apart relation to the seat to cause the motion unit to move the seat in response to contact to a predetermined portion of the seat with a predetermined force by the user so that the seat is adjusted by the user while maximizing ergonomic interaction between the driver and the sat.

Clause 2. A seat-movement system comprising
a seat including a seat bottom adapted to move along a floor of a vehicle and a seat back coupled to the seat bottom to move relative to the seat bottom,
a motion unit coupled to the seat and configured to permit a user to move the seat,
a remote interface unit including a plurality of preset seat arrangement profiles,
a monitoring unit coupled to the seat and adapted to receive ergonomically input from a user located in spaced-apart relation to the seat, and
a controller coupled to the remote interface to receive inputs from the remote interface and the monitoring unit and control the motion unit to rearrange the seat based on the inputs received.

Clause 3. A method of rearranging a vehicle seat comprising the steps of
providing a seat including a seat bottom adapted to move relative to a floor of a vehicle and a seat back coupled to the seat bottom to move relative to the seat bottom,
receiving an input from a monitoring unit coupled to one of a side bolster of the seat back, the seat bottom, or a headrest of the seat back, and
controlling rearrangement of the seat based on the received input.

Clause 4. A seat-movement system comprising
a seat including a seat bottom adapted to move along a floor of a vehicle and a seat back coupled to the seat bottom to move relative to the seat bottom.

Clause 5. The seat-movement system of any other clause or combination of clauses, further comprising a motion unit coupled to the seat and configured to permit a user to move the seat.

Clause 6. The seat-movement system of any other clause or combination of clauses, further comprising a monitoring unit coupled the seat and the motion unit.

Clause 7. The seat-movement system of any other clause or combination of clauses, wherein the monitoring unit is configured to provide means for sensing intent of the user located in spaced-apart relation to the seat to cause the motion unit to move the seat in response to contact to a predetermined portion of the seat with a predetermined force by the user so that the seat is adjusted by the user while maximizing ergonomic interaction between the driver and the sat.

Clause 8. The seat-movement system of any other clause or combination of clauses, further comprising a remote interface unit including a plurality of preset seat arrangement profiles.

Clause 9. The seat-movement system of any other clause or combination of clauses, further comprising a monitoring unit coupled to the seat.

Clause 10. The seat-movement system of any other clause or combination of clauses, wherein the monitoring unit is adapted to receive ergonomically input from a user located in spaced-apart relation to the seat.

Clause 11. The seat-movement system of any other clause or combination of clauses, further comprising a controller coupled to the remote interface to receive inputs from the remote interface and the monitoring unit and control the motion unit to rearrange the seat based on the inputs received.

Clause 12. A method of rearranging a vehicle seat comprising the steps of providing a seat including a seat bottom adapted to move relative to a floor of a vehicle and a seat back coupled to the seat bottom to move relative to the seat bottom.

Clause 13. The method of any other clause or combination of clauses, further comprising the steps of receiving an input from a monitoring unit.

Clause 14. The method of any other clause or combination of clauses, wherein the monitoring unit is coupled to a side bolster of the seat back.

Clause 15. The method of any other clause or combination of clauses, wherein the monitoring unit is coupled to the seat bottom.

Clause 16. The method of any other clause or combination of clauses, wherein the monitoring unit is coupled to a headrest of the seat back.

Clause 17. The method of any other clause or combination of clauses, further comprising the step of controlling rearrangement of the seat based on the received input.

Clause 18. The seat-movement system of any other clause or combination of clauses, wherein the monitoring unit includes one or more sensors coupled to at least one of the seat bottom, a backrest included in the seat back, and a headrest included in the seat back.

Clause 19. The seat-movement system of any other clause or combination of clauses, wherein the monitoring unit includes one or more sensors coupled to the seat bottom.

Clause 20. The seat-movement system of any other clause or combination of clauses, wherein the monitoring unit includes one or more sensors coupled to a backrest included in the seat back.

Clause 21. The seat-movement system of any other clause or combination of clauses, wherein the monitoring unit includes one or more sensors coupled to a headrest included in the seat back.

Clause 22. The seat-movement system of any other clause or combination of clauses, wherein the one or more sensors includes one of a force sensor and an accelerometer.

Clause 23. The seat-movement system of any other clause or combination of clauses, wherein the one or more sensors includes a force sensor.

Clause 24. The seat-movement system of any other clause or combination of clauses, wherein the one or more sensors includes an accelerometer.

Clause 25. The seat-movement system of any other clause or combination of clauses, wherein the motion unit communicates with a controller that is configured to move a track lock between a freed position in which the vehicle seat is freed to move relative to the floor and an engaged position in which the vehicle seat is blocked from moving relative to the floor.

Clause 26. The seat-movement system of any other clause or combination of clauses, wherein the motion unit communicates with the controller to cause a seat-back lock to move between a freed position in which the seat back is freed to pivot relative to the seat bottom and an engaged position in which the seat back is blocked from moving relative to the floor.

Clause 27. The seat-movement system of any other clause or combination of clauses, wherein the motion unit includes a seat-back motor coupled to the seat back to cause the seat back to pivot relative to the seat bottom and a track motor coupled to the vehicle seat to cause the vehicle seat to move back and forth relative to the floor.

Clause 28. The seat-movement system of any other clause or combination of clauses, wherein the motion unit includes a seat-back motor coupled to the seat back to cause the seat back to pivot relative to the seat bottom.

Clause 29. The seat-movement system of any other clause or combination of clauses, wherein the motion unit includes a track motor coupled to the vehicle seat to cause the vehicle seat to move back and forth relative to the floor.

Clause 30. The seat-movement system of any other clause or combination of clauses, wherein the monitoring unit detects an applied force and a controller activates one of the seat-back motor and the track motor in response to detecting the applied force.

Clause 31. The seat-movement system of any other clause or combination of clauses, wherein a speed of movement of the seat back are controlled by an amount of force applied to the monitoring unit.

Clause 32. The seat-movement system of any other clause or combination of clauses, wherein a speed of movement of the vehicle seat are controlled by an amount of force applied to the monitoring unit.

Clause 33. The seat-movement system of any other clause or combination of clauses, further comprising a pop-up bar coupled to the seat bottom and a release button coupled to the pop-up bar to cause the pop-up bar to move up away from the seat bottom in response to engagement of the release button to cause the pop-up bar to provide grip means for gripping the vehicle seat during movement of the vehicle seat.

Clause 34. The seat-movement system of any other clause or combination of clauses, wherein the monitoring unit includes a sensor coupled to a first side bolster of the vehicle seat located between a second side bolster of the vehicle seat and a user located in spaced-apart relation to the seat.

Clause 35. The seat-movement system of any other clause or combination of clauses, wherein an input from the remote interface unit includes a selection of one of the preset seat arrangement profiles.

Clause 36. The seat-movement system of any other clause or combination of clauses, wherein an input from the monitoring unit includes a force or force gesture sensed at a predetermined portion of the seat.

Clause 37. The seat-movement system of any other clause or combination of clauses, wherein an input from the monitoring unit includes a force sensed at a predetermined portion of the seat.

Clause 38. The seat-movement system of any other clause or combination of clauses, wherein an input from the monitoring unit includes a force gesture sensed at a predetermined portion of the seat.

Clause 39. The seat-movement system of any other clause or combination of clauses, wherein the predetermined portion of the seat includes one of the seat bottom, a side bolster included in the seat back, and a headrest included in the seat back.

Clause 40. The seat-movement system of any other clause or combination of clauses, wherein the predetermined portion of the seat is the seat bottom.

Clause 41. The seat-movement system of any other clause or combination of clauses, wherein the predetermined portion of the seat is a side bolster included in the seat back.

Clause 42. The seat-movement system of any other clause or combination of clauses, wherein the predetermined portion of the seat is a headrest included in the seat back.

Clause 43. The seat-movement system of any other clause or combination of clauses, further comprising an enablement unit configured to block selectively the controller from rearranging the seat in response to sensing a person on the seat or sensing an object impeding rearrangement of the seat.

Clause 44. The seat-movement system of any other clause or combination of clauses, further comprising an enablement unit configured to block selectively the controller from rearranging the seat in response to sensing a person on the seat.

Clause 45. The seat-movement system of any other clause or combination of clauses, further comprising an enablement unit configured to block selectively the controller from rearranging the seat in response to sensing an object impeding rearrangement of the seat.

Clause 46. The seat-movement system of any other clause or combination of clauses, wherein the controller controls the motion unit to cause at least one of the vehicle seat and seat back to move to the selected seat arrangement profile.

Clause 47. The seat-movement system of any other clause or combination of clauses, wherein the motion unit includes a seat-back actuator and a seat-bottom actuator and the controller releases the seat-bottom actuator to slide the vehicle seat along the floor and/or releases the seat-back actuator to pivot the seat back relative to the seat bottom in response receiving inputs from the remote interface and the monitoring unit.

Clause 48. The seat-movement system of any other clause or combination of clauses, wherein the motion unit includes a seat-back actuator and the controller releases the seat-back actuator to pivot the seat back relative to the seat bottom in response receiving inputs from the remote interface and the monitoring unit.

Clause 49. The seat-movement system of any other clause or combination of clauses, wherein the motion unit includes a seat-bottom actuator and the controller releases the seat-bottom actuator to slide the vehicle seat along the floor in response receiving inputs from the remote interface and the monitoring unit.

Clause 50. The seat-movement system of any other clause or combination of clauses, wherein the controller causes the seat-back actuator and the seat-bottom actuator to block movement of the vehicle seat and the seat back in response to reaching the preset arrangement profile.

Clause 51. The seat-movement system of any other clause or combination of clauses, wherein the controller causes the seat-back to block movement of the seat back in response to reaching the preset arrangement profile.

Clause 52. The seat-movement system of any other clause or combination of clauses, wherein the controller causes the seat-bottom actuator to block movement of the vehicle seat in response to reaching the preset arrangement profile.

Clause 53. The method of any other clause or combination of clauses, wherein the controlling step includes the step of activating at least one of a seat-back motor and a track motor.

Clause 54. The method of any other clause or combination of clauses, wherein the controlling step includes the step of activating a seat-back motor.

Clause 55. The method of any other clause or combination of clauses, wherein the controlling step includes the step of activating a track motor.

Clause 56. The method of any other clause or combination of clauses, wherein the controlling step includes the step of releasing at least one of a seat-back lock and a track lock.

Clause 57. The method of any other clause or combination of clauses, wherein the controlling step includes the step of releasing a seat-back lock.

Clause 58. The method of any other clause or combination of clauses, wherein the controlling step includes the step of releasing a track lock.

The invention claimed is:

1. A seat-movement system comprising:
a seat including a seat bottom adapted to move along a floor of a vehicle and a seat back coupled to the seat bottom to move relative to the seat bottom,
a motion unit coupled to the seat and configured to permit a user to move the seat, and
a monitoring unit coupled with the seat and with the motion unit and configured to receive an input from the user located in spaced-apart relation to the seat to cause the motion unit to move the seat in response to contact to a predetermined portion of the seat with a predetermined force by the user so that the seat is adjusted by the user while maximizing ergonomic interaction between the user and the seat,
wherein the seat-movement system further includes an enablement unit coupled with the seat and configured to determine if a person is supported on the seat and to block the motion unit from permitting the user to move the seat by contacting the predetermined portion of the seat with the predetermined force if the enablement unit determines that the person is supported on the seat.

2. The seat-movement system of claim 1, wherein the monitoring unit includes one or more sensors coupled to at least one of the seat bottom, a backrest included in the seat back, and a headrest included in the seat back.

3. The seat-movement system of claim 2, wherein the one or more sensors includes one of a force sensor and an accelerometer.

4. The seat-movement system of claim 1, wherein the motion unit communicates with a controller that-is configured to move a track lock between a freed position in which the vehicle seat is freed to move relative to the floor and an engaged position in which the vehicle seat is blocked from moving relative to the floor.

5. The seat-movement system of claim 4, wherein the motion unit communicates with the controller to cause a seat-back lock to move between a freed position in which the seat back is freed to pivot relative to the seat bottom and an engaged position in which the seat back is blocked from moving relative to the floor.

6. The seat-movement system of claim 1, wherein the motion unit includes a seat-back motor coupled to the seat back to cause the seat back to pivot relative to the seat bottom and a track motor coupled to the vehicle seat to cause the vehicle seat to move back and forth relative to the floor.

7. The seat-movement system of claim 6, wherein the monitoring unit detects an applied force and a controller activates one of the seat-back motor and the track motor in response to detecting the applied force.

8. The seat-movement system of claim 7, wherein a speed of movement of the seat back and the vehicle seat are controlled by an amount of force applied to the monitoring unit.

9. The seat-movement system of claim 1, further comprising a pop-up bar coupled to the seat bottom and a release button coupled to the pop-up bar to cause the pop-up bar to move up away from the seat bottom in response to engagement of the release button to cause the pop-up bar to provide grip means for gripping the vehicle seat during movement of the vehicle seat.

10. The seat-movement system of claim 9, wherein the monitoring unit includes a sensor coupled to a first side bolster of the vehicle seat located between a second side bolster of the vehicle seat and a user located in spaced-apart relation to the seat.

11. A seat-movement system comprising:
a seat including a seat bottom adapted to move along a floor of a vehicle and a seat back coupled to the seat bottom to move relative to the seat bottom,
a motion unit coupled to the seat and configured to permit a user to move the seat,
a remote interface unit including a plurality of preset seat arrangement profiles,
a monitoring unit coupled to the seat and adapted to receive ergonomically input from a user located in spaced-apart relation to the seat, and
a controller coupled to the remote interface to receive inputs from the remote interface and the monitoring unit and control the motion unit to rearrange the seat based on the inputs received,
wherein the seat-movement system further includes an enablement unit coupled to the seat and configured to determine if a person is supported on the seat and to block the controller from controlling the motion unit to rearrange the seat based on the inputs received if the enablement unit determines that the person is supported on the seat.

12. The seat-movement system of claim 11, wherein an input from the remote interface unit includes a selection of one of the preset seat arrangement profiles.

13. The seat-movement system of claim 11, wherein an input from the monitoring unit includes a force or force gesture sensed at a predetermined portion of the seat.

14. The seat-movement system of claim 13, wherein the predetermined portion of the seat includes one of the seat bottom, a side bolster included in the seat back, and a headrest included in the seat back.

15. The seat-movement system of claim 11, wherein the controller controls the motion unit to cause at least one of the vehicle seat and seat back to move to the selected seat arrangement profile.

16. The seat-movement system of claim 12, wherein the motion unit includes a seat-back actuator and a seat-bottom actuator and the controller releases the seat-bottom actuator to slide the vehicle seat along the floor and/or releases the seat-back actuator to pivot the seat back relative to the seat bottom in response receiving inputs from the remote interface and the monitoring unit.

17. The seat-movement system of claim 16, wherein the controller causes the seat-back actuator and the seat-bottom actuator to block movement of the vehicle seat and the seat back in response to reaching the preset arrangement profile.

18. A method of rearranging a vehicle seat comprising the steps of:
   providing a seat including a seat bottom adapted to move relative to a floor of a vehicle and a seat back coupled to the seat bottom to move relative to the seat bottom,
   receiving an input from a monitoring unit coupled to one of a side bolster of the seat back, the seat bottom, or a headrest of the seat back,
   determining if an occupant is supported on the seat,
   blocking rearrangement of the seat based on the received input if an occupant is determined to be supported on the seat, and
   controlling rearrangement of the seat based on the received input if an occupant is not determined to be supported on the seat.

19. The method of claim 18, wherein the controlling step includes the step of activating at least one of a seat-back motor and a track motor.

20. The method of claim 18, wherein the controlling step includes the step of releasing at least one of a seat-back lock and a track lock.

* * * * *